Figure 3:
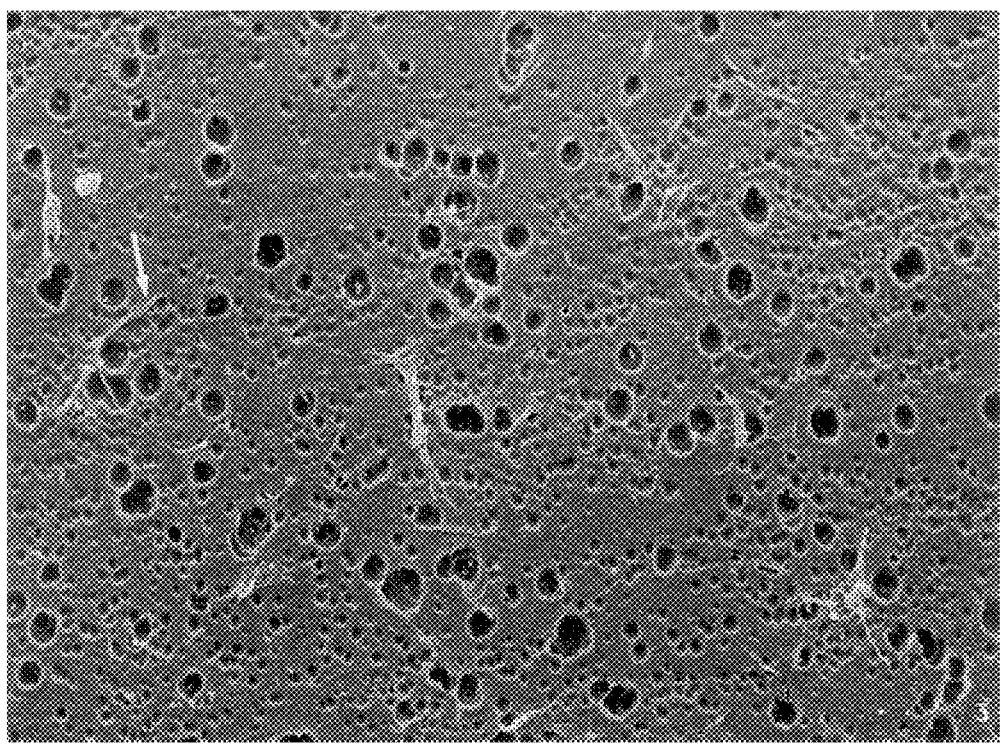

United States Patent

Zuccato et al.

[11] Patent Number: 6,107,453
[45] Date of Patent: Aug. 22, 2000

[54] PROCESS OF SURFACE ACTIVATION OF BIOCOMPATIBLE AND BIOABSORBABLE ALIPHATIC POLYESTERS AND POLYESTERS THUS ACTIVATED

[75] Inventors: Alessandro Zuccato, Verona; Gian Domenico Cella, Novara; Gabriele Perego, Milan, all of Italy

[73] Assignee: Sanitaria Scaligera S.P.A., Verona, Italy

[21] Appl. No.: 09/011,320

[22] PCT Filed: Jul. 24, 1996

[86] PCT No.: PCT/IT96/00149

§ 371 Date: Jan. 27, 1998

§ 102(e) Date: Jan. 27, 1998

[87] PCT Pub. No.: WO97/05193

PCT Pub. Date: Feb. 13, 1997

[30] Foreign Application Priority Data

Jul. 28, 1995 [IT] Italy .................................. UR95A0068

[51] Int. Cl.[7] .......................................................... C08F 6/00
[52] U.S. Cl. .......................... 528/481; 528/483; 528/488; 528/489; 528/492; 528/495; 528/503
[58] Field of Search ..................... 528/481, 483, 528/488, 489, 492, 495, 503

[56] References Cited

U.S. PATENT DOCUMENTS 5,236,563 8/1993 Loh .......................................... 204/165

FOREIGN PATENT DOCUMENTS

| 0 358 819 | 3/1990 | European Pat. Off. . |
| 0 558 965 | 9/1993 | European Pat. Off. . |
| 2 141 435 | 12/1984 | United Kingdom . |
| 2 167 665 | 6/1986 | United Kingdom . |

*Primary Examiner*—Samuel A. Acquah
*Attorney, Agent, or Firm*—Oppehneimer, Wolff & Donnelly LLP

[57] ABSTRACT

A process of surface activation of a material based on one or more of the copolymers of lactic acid and $\epsilon$-caprolactone is carried out on bioabsorbable and biocompatible aliphatic polyesters chosen from the group formed by homo- and copolymers derived from L-lactide, D-lactide, racemic D,L-lactide, meso D,L Lactide, $\epsilon$-caprolactone, glycolide, $\delta$-valerolactone, p-dioxanone, preferably copolymers of L-lactide, D-lactide, racemic D,L lactide, meso D,L-lactide with $\epsilon$-caprolactone; the process consists of performing at least one of the following treatments: acid or base hydrolysis, treatment by means of cold plasma, by chemical reactions or electromagnetic radiations.

The process brings about a substantial increase in surface hydrophilicity and, consequently, a significant lowering of the wetting angle measured with water at 23 degrees Celsius in air.

This can in many cases favor cellular adherence to bioabsorbable medical prostheses realized using these materials, and thus surface-activated, such as for example endothelialisation processes in vascular grafts.

28 Claims, 4 Drawing Sheets

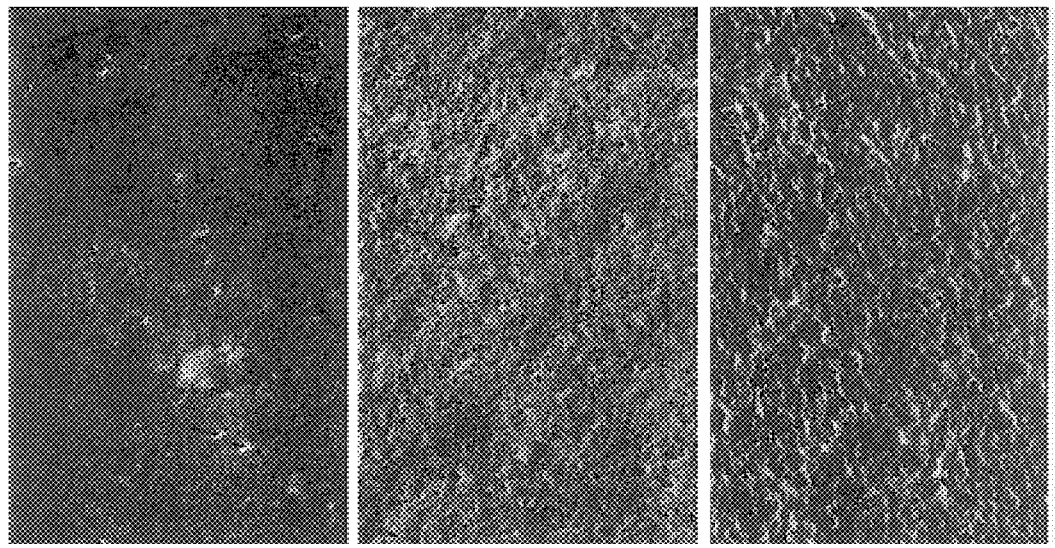
Fig 1a  Fig 1b  Fig 1c
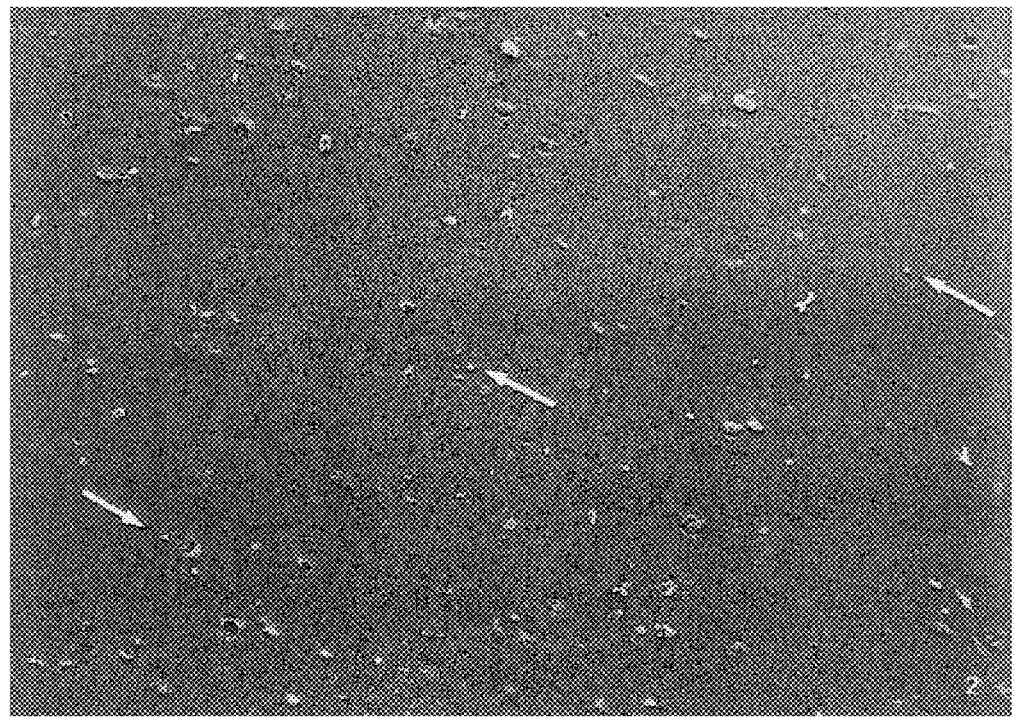
Fig 2

PROCESS OF SURFACE ACTIVATION OF BIOCOMPATIBLE AND BIOABSORBABLE ALIPHATIC POLYESTERS AND POLYESTERS THUS ACTIVATED

The invention relates to surface-activated copolymers of lactic acid and $\epsilon$-caprolactone and to a procedure for preparation thereof.

In recent times homo- and copolymers of lactic acid have been the subject of growing attention regarding their potential applications, in part already put into practice, in the biomedical sector.

Such applications, which take advantage of the biocompatibility and biodegradability of these materials, comprise among other things the manufacture of prosthetic implants, suture threads, microspheres for vehicling of principal active ingredients.

A relative advantage of these materials is that of eliminating the need for a second surgical intervention, sometimes necessary for removing the implant, thanks to the gradual biodegradability which favors regeneration of the pre-existing tissues.

This advantage has been exploited, for example, in the preparation of bioabsorbable suture threads using homo- and copolymers of glycolic acid, commercially known as DEXON (mark of the company Davis and Jeck) and VICRYL (mark of the company Ethicon). In more recent times commercialisation has begun of the first products for the orthopaedic sector, known as BIOFIX (mark of Bioscience Oy) and ORTHOSORB (mark of the company Johnson and Johnson).

A field of use of bioabsorbable materials which has great use potential is the preparation of vascular grafts. Implants at present available, often made in DACRON (a material provided by the company Du Pont of Nemurs), as they are not bioabsorbable, lack in some important requisites, such as for example a complete absence of thrombogenicity of the internal wall, or elastic properties which remain unaltered over time [New Polymeric Mater, 1 (2), 111–126 (1988)]. These limitations become important especially when prostheses are below 6 mm diameter, which often leads during surgery to implant of autologous veins to repair small-caliber arteries, with all the problems deriving there-from.

The development of a biodegradable vascular prosthesis, which would thus promote the regeneration of pre-existing tissue, is of great interest and is at present the object of many studies for example, see Colloid Polym. Sci 264, 854–858 (1986), but is also hindered by the problem of thrombogenicity for small calibers.

Thrombotic formation on the internal wall of the prosthesis happens especially during the initial implant phase, that is before the wall has been covered with endothelial cells, for which reason a biocompatible and bioabsorbable material for the manufacturing of a vascular graft would have a relevant advantage if it could have surface alterations aimed at accelerating the endothelialisation process.

The copolymers of lactic acid (L-lactic) and $\epsilon$-caprolactone, developed in 1975 by Gulf Oil see U.S. Pat. No. 4,057,537 (Sinclair) are very interesting materials for various biomedical uses, among which the realisation of nerve guides Biomaterial 15 (3), 189–193 (1994), J. Mater Sci. Mater in Medicine 4, 521–525 (1993), suture threads and bioabsorbable vascular prostheses.

The interest in these materials is linked, other than for their biocompatibility and bioabsorbability, to their excellent elastic properties (Polymer Bulletin 25, 335–341 (1991)) which are stable over time, especially for copolymers with about equal components of two comonomers (Makromol Chem 194, 2463–2469 (1993)).

These materials, on the other hand, have the drawback as far as biomedical use is concerned of having a low hydrophilicity, which reduces their wettability and the adherence of the organism cells, namely the endothelial cells. For the poly (L-Lactide-co-$\epsilon$-caprolactone) at 50/50 weight, for example, the wetting angle measured with distilled water in air at 23° C. is 82°, thus very high.

GB-A-2,141,435 discloses a method based on irradiation or hydrolytic treatments to control the physical properties of structural surgical elements made from bioabsorbable polymer materials so that the rate of strength loss and degradation in vivo is altered to achieve disintegration into fragments suitable for removal from or passage through the body without the need for waiting the material is absorbed.

EP-A-0 358 819 deals with an artificial skin or bandage which is formed from an elastomeric layer which is surfaced by a fibrous wound contacting layer which is first formed into a fabric and subsequently degraded by heat hydrolysis or other degradative treatment into a form which could no longer be formed into a fabric but which forms an idea bioadsorbable wound contact surface in which damage to the newly formed, fragile epidermus is minimized.

An aim of the present invention is to provide a process aimed at surface modification of a material based on one or more of the copolymers of lactic acid and $\epsilon$-caprolactone such as to bring about a substantial increase in surface hydrophilicity and, consequently, a significant lowering of the wetting angle measured with water at 23 degrees Celsius in air.

This can in many cases favor cellular adherence to bioabsorbable medical prostheses realised using these materials, and thus surface-activated, such as for example endothelialisation processes in vascular grafts.

A further aim of the present invention is that said treatment is also aimed at reducing autoadhesiveness of said material in order to achieve considerable advantages in the manipulation and use of films, medical prostheses and the like.

According to a first aspect of the present invention a process of surface activation is provided of bioabsorbable and biocompatible aliphatic polyesters chosen from the group formed by homo- and copolymers derived from L-lactide, D-lactide, racemic D,L-lactide, meso D,L Lactide, $\epsilon$-caprolactone, glycolide, $\delta$-valeroactone, p-dioxanone, preferably copolymers of L-lactide, D-lactide, racemic D,L lactide, meso D,L-lactide with $\epsilon$-caprolactone, which consists of performing at least one of the following treatments: acid or base hydrolysis, treatment by means of cold plasma, by chemical reactions or electromagnetic radiations.

Advantageously, the process of hydrolysis is conducted in the presence of an aqueous solution of a base or an acid to accelerate surface reaction, inasmuch as excessively long processes of activation can induce a reduction in molecular weight and thus in the mechanical properties of the material.

At present preferred is the use of an aqueous solution of a base which constitutes a preferential condition inasmuch as it has demonstrated greater activity.

Suitable bases for obtaining watery solutions suited to the aim are, for example, strong alkalis, such as LiOH, $Ba(OH)_2$, $Mg(OH)_2$, NaOH, KOH, $Na_2CO_3$, $Ca(OH)_2$ and the weak bases, such as for example $NH_4OH$ and the ammines such as methylamine, ethylamine, diethylamine and dimethylamine.

Acids suitable for surface hydrolysis treatments can be chosen, for example, from among HCl, $HClO_3$, $HClO_4$, $H_2SO_3$, $H_2SO_4$, $H_3PO_3$, $H_3PO_4$, HI, $HIO_3$, HBr, lactic acid, glicolic acid.

Surface activation by means of hydrolysis can be conducted at temperatures preferably comprised between 0 degrees Celsius and the material softening temperature.

In the case of the 50/50 poly(L-lactide-co-ϵ-caprolactone), suitable temperatures are, for example, comprised between 5° and 80° C., preferably between 30° and 50° C.

Surface hydrolysis treatment is followed by careful washing to remove all traces of acid or base.

This surface hydrolytic treatment has been found to:
 produce a relevant surface change accompanied by a lowering of the wetting angle measured with water at 23° C. in air, which in the case of poly(L-lactide-co-ϵ-caprolactone) at 50/50 weight passes from 82° to 30°;
 modify morphologically the surface of the material with the creation of numerous microporosities, useful in cell seeding processes, such as for example endothelialisation;
 substantially reduce autoadhesivity of the material, whose shear detachment force changes from an initial 10 Kg/cm to 0 Kg/cm following colonisation, with considerable advantages in manipulation and use of films, medical prostheses, etc.;
 unexpectedly, the viscosity inherent in the copolymer during the process of activation does not undergo appreciable variation, such as to reduce its mechanical properties.

According to a preferred form of embodiment of the present invention, the process is carried out using homo- or copolymers of lactic acid, preferably the copolymers of lactic acid and ϵ-caprolactone.

These copolymers can be obtained, as is known, by means of polymerisation by ring opening polymerisation of the cyclic dymer ring of lactic acid (L-lactic, in the case of L-lactic acid) and ϵ-caprolactone, at temperatures generally comprised between 100° C. and 200° C. and in the presence of a suitable catalyst, such as for example Sn octanoate $SnCl_2$, $Al(iOPr)_3$, etc.

The copolymers of lactic acid and ϵ-caprolactone are suitable for working with the common methodologies used in heat-forming of plastic materials, such as for example, extruders, injection-moulders and so on.

These copolymers are also soluble in various organic solvents, among which, for example, methyl acetate, ethyl acetate, methylene choride, chloroform, etc., for which reason many manufactured products, for example canicular prostheses, can be obtained by exploiting this solubility, with known processes, such as for example deposition, spreading, etc, Plasma treatment can be carried out both in the presence of a reactive gas, for example air, Ar, $O_2$ with the formation of surface activation of oxygenate type, such as —OH, —CHO, —COOH.

Surface treatment, whether hydrolytic or with plasma, can remain unaltered or can be followed by further chemical modifications. Thus, for example, the COONa groups generated by a base hydrolysis can be subsequently converted into COOH groups by treatment with strong mineral acids.

Further, the surface freeing of alcoholic groups by means of a hydrolysis process can be followed by reaction by means of the addition of a compound provided with functional group or groups able to react with surface alcoholic groups, such as for example by means of the addition of an anhydride such as succinic anhydride, with the conversion of —OH groups into —O—CO—$CH_2$—$CH_2$—COOH groups.

In a further aspect of the present invention, prosthetic implants are provided which are realised with homo and copolymers of lactic acid, surface-activated for obtaining biocompatible and biodegradable materials. An example thereof is constituted by a partially bioabsorbable vascular prosthesis.

The process according to the invention is described in more detail in the following, with reference to specific examples of practical realisation.

EXAMPLE 1

Preparation of poly (L-lactide-co-ϵ-caprolactone)

L-lactide was synthesised and recrystallised 3 times by methyl anhydrous isobutyl ketone, dried under vacuum at 45° C. for 24 hours and kept in a nitrogen atmosphere. ϵ-caprolactone, provided by Fluka, was dried on $CaH_2$, distilled at low pressure just before use and was kept under nitrogen. Hexane, provided by Farmitalia Carlo Erba, was distilled on $LiAlH_4$ and kept under nitrogen.

200 g of L-lactide, 200 g (186 ml) of ϵ-caprolactone and an stirring magnet were placed in a preferably silanised (with $Si(CH_3)_2Cl_2$) 500 ml two-neck flask. The flask was immersed in an oil bath whose temperature was gradually brought to 130° C., homogenizing the system as soon as made possible by the fusion of the lactide, by means of electromagnetic stirring.

A solution of 1.19 g of Sn octanoate in hexane was prepared separately, up to a volume of 10 ml, from which a measure of 2.13 ml was removed, which was equal to a content of 0.254 g of Sn octoanate (having a catalysing function), which was then added to the monomer mixture. About 45 minutes after addition of the catalyst, whose quantity corresponded to a molar monomer/catalyst rapport of 5000, the electromagnetic stirring of the mixture became ineffective due to the system viscosity.

The reaction was protracted for 24 hours, thus obtaining an elastic transparent material having an inherent viscosity measured in chloroform at 25° C. of 3.80 dl/g and a residual monomer content of 2.3%, as estimated by TGA (thermogravimetric-isotherm analysis at 150° C. for 60 minutes).

EXAMPLE 2

Preparation of discs in 50/50 poly(L-lactide-co-ϵ-caprolactone)

A 10×10 cm steel template was used, located between two Mylar sheets, in which 8 g of poly (L-lactide-co-ϵ-caprolactone) at 50/50 weight were placed.

Pressing was performed with three preheating minutes and 2 compression minutes at 50 Kg/cm at a temperature of 160° C. Thus copolymer sheets were produced, having a thickness of 500 micron, from which 22 mm diameter discs were die-cut. These discs exhibited a wetting angle with water, measured at 23° C. in air, of 82°. The inherent viscosity of the material, determined in chloroform at 25° C., at a concentration of 0.2 g/dl, by Ubbelohde friction-tube viscometer, was 3.04 dl/g.

FIG. 1a is a microphotograph obtained by scanning electron microscope (SEM) at a magnification of 1500×, which illustrates the surface morphology of a disc in non-activated poly(L-lactide-co-ϵ-caprolactone) prepared as above-specified.

EXAMPLE 3

Activation by means of base hydrolysis at 40° C.

80 ml of dilute solution of NaOH at 5% were placed in a 100 ml flask, and a disc of 50/50 poly (L-lactide-co-ϵ- caprolactone) having a thickness of 500 micron and a diameter of 22 mm was prepared, as described in example 1. The flask was immersed in a thermostated water bath at 40° C., and stirred by an electromagnet.

These conditions were maintained for 18 hours, then the alkaline solution was removed and the whole was repeatedly washed with distilled water for four hours. The discs of the material thus activated exhibited a wetting angle with water of 30°, measured at 23° C. in air. The inherent viscosity of the material, determined in chloroform at 25° C., at a concentration of 0.2 g/dl was 3.00 dl/g.

EXAMPLE 4

Activation by means of base hydrolysis at 20° C.

80 ml of dilute NaOH at 5% were placed in a 100 ml flask and a 50/50 poly(L-lactide-co-ε-caprolactone) disc having a thickness of 500 micron and a diameter of 22 mm was prepared, as described in example 1. The flask was kept at a temperature of 20° C., slowly stirring the contents by means of an electromagnet. These conditions were maintained for 18 hours, then the alkaline solution was removed and numerous washes with distilled water were carried out over a period of 4 hours.

The discs of material thus activated exhibited a wetting angle with water of 48°, measured at 23° C. in air. The inherent viscosity of the material, determined in chloroform at 25° C. at a concentration of 0.2 g/dl was 3.02 dl/g.

FIG. 1b is a microphotograph obtained by scanning electron microscope (SEM) at a magnification of 1500×, which illustrates the surface morphology of a disc in poly(L-lactide-co-ε-caprolactone) activated by base hydrolysis with NaOH according to the present example.

EXAMPLE 5

Conversion of —COONa surface groups into —COOH groups 80 ml of 3% HCl solution were placed in a 100 ml flask and a 50/50 poly(L-lactide-co-ε-caprolactone) disc having a thickness of 500 micron and a diameter of 22 mm was introduced, as described in example 3. The flask was kept at a temperature of 20 C., slowly stirring the contents by means of an electromagnet for 1 hour, then the acid solution was removed and numerous washes with distilled water were carried out over a period of 4 hours.

The discs of material thus activated exhibited a wetting angle with water of 47°, measured at 23° C. in air.

FIG. 1c is a microphotograph obtained by scanning electron microscope (SEM) at a magnification of 1500×, which illustrates the surface morphology of a disc in poly(L-lactide-co-ε-caprolactone) activated by base hydrolysis with NaOH and acid hydrolysis by HCl.

EXAMPLE 6

Conversion of —COONa surface groups into —COOH groups 80 ml of 3% HCl acqueous solution were placed in a 100 m flask and a 50/50 poly (L-lactide-co-ε-caprolactone) disc was introduced, as described in example 4. The flask was immersed in a thermostatised water bath at a temperature of 20° C., slowly agitating the contents by means of an electromagnet for 1 hour, then the acid solution was removed and numerous washes with distilled water were carried out over a period of 4 hours. The discs of material thus activated exhibited a wetting angle with water of 70, measured at 23° C. in air.

EXAMPLE 7

Activation by means of cold plasma

A parallel flat plate Gambetti plasma treatment reactor with capacitative coupling was used. The radiofrequency the machine operated at was 13.6 Mhz.

Activation was carried out on discs of 50/50 poly(L-lactide-co-ε-caprolactone) having a thickness of 500 micron and a diameter of 22 mm, prepared as described in Example 1.

These discs were applied with plasmas of air, oxygen and argon at a temperature of 20° C., at 20 and 50 Watts, for times of 30 and 60 seconds. The copolymer discs thus activated exhibited wetting angles with distilled water in air comprised between 31° and 55°, as reported in Table 1 hereinbelow.

It can be observed that the variation in treatment times, from 30 seconds to one minute, had a relevant effect only in the case of the low-potential plasmas used (20 W), while with 50 W the surface activation with the plasmas used seems to have reached a limit level after 30 seconds of treatment.

In the case of air, 50 W potential plasma activated the surface of the material to a greater degree (32°–31°), with respect to 20 W plasma (54.5, 47). In the case of oxygen and argon plasmas no significant differences were observed between the different potentials.

Among the experimental conditions adopted, therefore, a 50 W potential air plasma produced the greatest activation. This can be explained by the fact that the inert part of air, especially nitrogen, generates numerous radicals on the surface of the material, which is followed by a reaction with oxygen molecules and the formation of activated groups of oxygenate type such as —OH, —CHO, —COOH.

TABLE 1

Surface activation of 50/50 poly (L-lactide-co-ε-caprolactone) discs with cold plasma.

| SAMPLE | GAS PLASMA | POTENTIAL (W) | TIME (SEC.) | WETTING ANGLE. |
|---|---|---|---|---|
| 1 | air | 20 | 30 | 54, 5 |
| 2 | air | 20 | 60 | 47 |
| 3 | air | 50 | 30 | 32 |
| 4 | air | 50 | 60 | 31 |
| 5 | oxygen | 20 | 30 | 52 |
| 6 | oxygen | 20 | 60 | 44, 5 |
| 7 | oxygen | 50 | 30 | 47 |
| 8 | oxygen | 50 | 60 | 55 |
| 9 | argon | 20 | 30 | 55 |
| 10 | argon | 20 | 60 | 46 |
| 11 | argon | 50 | 30 | 47 |
| 12 | argon | 50 | 60 | 47 |

EXAMPLE 8

Measures of Material Autoadherence

We proceeded as in examples from 3 to 7 and the copolymer was successfully compression molded using a 5×5 cm steel template having a thickness of 1 mm, located between two Mylar® sheets, wherein were placed 3 g of 50/50 poly(L-lactide-co-ε-caprolactone).

The compression molding was executed with 3 minutes of preheating and 2 minutes of compression at 50 Kg/cm at a temperature of 160° C. Sheets of copolymer were thus prepared, having a thickness of 1 mm, from which strips of 50×10×1 mm were cut.

The test pieces for the autoadherence measurements were produced by superposing by 10 mm the ends of two copolymer strips. The measurement of the shear force was effected immediately after pressing by using an Instron model 4501 dynamometer at a temperature of 23° C. and in relative humidity of 50%. This calculation, effected at a velocity of 200 mm/min., provided the force needed to cause shear detachment of the two surfaces, equal to 10 Kg/cm for the non-modified copolymer.

The strips of surface-activated poly(L-lactide-co-ε-caprolactone) did not give rise to any adherence in the above-reported conditions.

FIG. 2 is a SEM 100× microphotograph illustrating the surface morphology of a non-activated poly(L-lactide-co-ε-caprolactone) disc and seeded with endothelial cells from a microcirculation of human fatty tissue: 4 days of culture.

Note the presence of few cells having a prevalently rounded shape (some of which are indicated by arrows).

EXAMPLE 9

Cell Culture on non-activated discs

Discs of 50/50 poly(L-lactide-co-ε-caprolactone) having a thickness of 500 micron and a diameter of 22 mm were subjected to sterilisation with ethylene oxide and kept in sterile containers up to the moment of cell seeding.

For the seeding human endothelial cells were used, isolated from the microcirculation of human fatty tissue, removed from the abdominal wall of patients subjected to surgical operation for abdominal aneurysm.

Variable quantities (10–20 g) of fatty tissue were snipped using small scissors and transferred into an Erlemayer flask containing Collagenase Type 1 0.2% (SIOGMA - St. Louis Mo. USA) in PBS (Phosphate Buffer Saline pH 7.4).

After an incubation period of 30 minutes at 37° C., constantly shaken, the floating adipocytes were eliminated and the residual cellular suspension centrifuged for 10 minutes at 200 x g.

The resulting pellet was re-suspended in PBS (Phosphate Buffer Saline pH 7.4) containing 0.1% of BSA (Bovine Serum Albumin fraction V IgG free, Low endotoxin) (SIGMA) and the cellular suspension obtained was subjected to filtration through a nylon filter having a porosity of about 200 micron. After a further wash and centrifugation the pellet was re-suspended in 2 ml of PBS/BSA and delicately layered on 8 ml of Percoll 45% (mark of the company SIGMA) in PBS (280 mOsm) and centrifuged at 1500×g for 20 minutes.

The microvascular endothelial cells were recovered in a milky layer on the surface of the Percoll (SIGMA). After additional washes, the microvascular cells were re-suspended in Medium 199 25 MM Hepes (GIBCO BRL, Paisley, Scotland) containing 20% FCS (Foetal Calf Serum) (GIBCO BRL), 50 g/ml ECGF (Endothelial Cell Growth Factor( (SIGMA), 100 U/ml heparin (SIGMA), 100 U/ml of penicillin (GIBCO BRL) and 100 g(ml of streptomycin (GIBCO BRL) and subjected to hemocytometer count and Trypan Blue Stain exclusion test (Flow Laboratories, Irvine, Scotland) for evaluation of cell vitality.

All the operations described were carried out in conditions of total sterility under a laminar flow hood, and using sterile single-use glass and plastic materials. The poly(L-lactide-co-ε-caprolactone) discs were transferred, after repeated washes in sterile PBS (Phosphate Buffer Saline pH 7.4) in adequate size Cell Wells 12 well plate, well diameter 22 mm - CORNING, N.Y. USA). On each disc, lying at the bottom of the wells, from 1 to 2×10 cells per cm were seeded in about 3 ml of complete Medium 199 (SIGMA).

The culture was left for 4 to 6 days in an incubator at 37° C. in a 5% $CO_2$ atmosphere.

The discs were kept 4 days under culture and then fixed in 2.5% glutaraldehyde (BAKER, Deventer, Holland) in cacodylate buffer (CARLO ERBA, Milan) and 1% osmic acid anhydrite (BAKER) in the same buffer, dehydrated in a growing series of ethanol (CARLO ERBA) and air-dried. Then they were subjected to analysis by means of scanning electron microscope.

On non-activated lactic acid copolymer discs only rare cells were visible, not numerically evaluable, and with a prevalence of rounded shapes (indicating poor adherence to substrate).

EXAMPLE 10

Cell culture on NaOH activated discs

Isolation of the endothelial cells and the cell culture were performed using the modalities described in example 9 above.

The SEM analysis of the lactic acid copolymer discs subjected to base hydrolysis enable observation of the adherence of a certain number of endothelial cells, not exactly quantifiable, which, al the same, exhibited aspects of better adherence to the substrate (flat cells).

FIG. 3 is an SEM X 100 microphotograph illustrating the surface morphology of a poly(L-lactide-co-ε-caprolactone) disc activated with NaOH and seeded with endothelial cells from the microcirculation of human fatty tissue: 4 culture days.

The microphotograph shows the presence of flat cells (indicated by arrows in FIG. 3).

EXAMPLE 11

Cell culture on discs activated with NaOH/HCl

Isolation of the endothelial cell and the cell culture was achieved using the modalities described in example 9. The SEM analysis of the discs subjected to base hydrolysis and further activated with HCl, allowed identification of a relevant number of endothelial cells (approximately $8 \times 10^3$/cm) with flat-spindled morphology, which is an indication of good adherence to the substrate.

Figure 4:
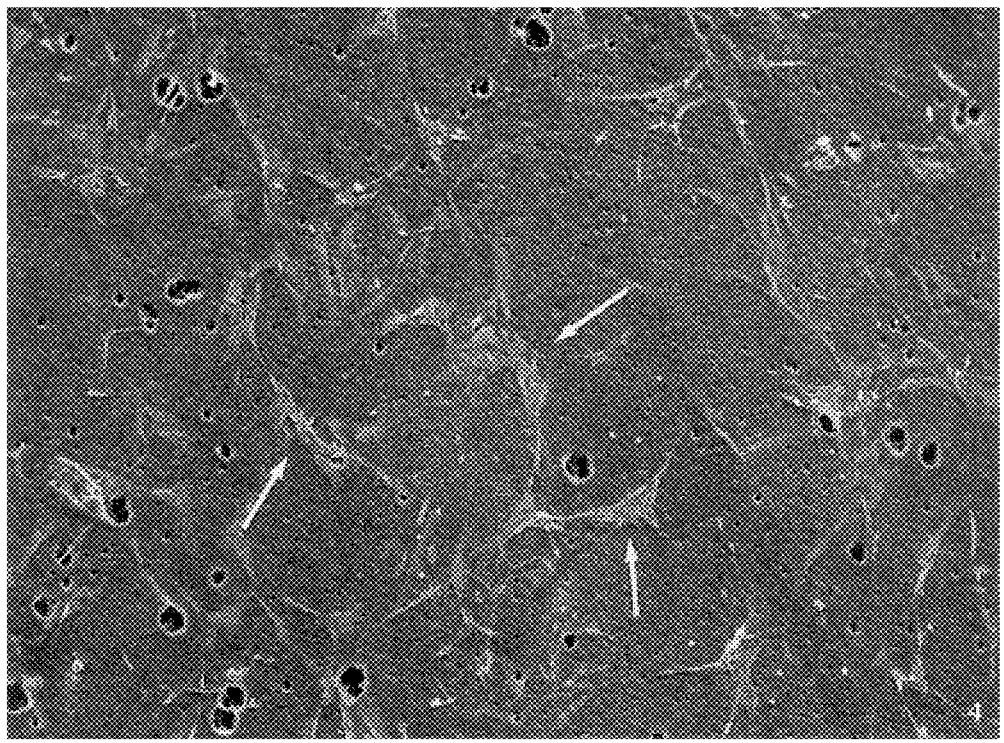

FIG. 4 is a SEM X 100 microphotograph showing the surface morphology of a disc in poly(L-lactide-co-ε-caprolactone) activated with NaOH and HCl and seeded with endothelial cells from the microcirculation of human fatty tissue: 4 culture days. The presence of numerous flat cells can be observed (indicated with arrows in the figure).

The results of the surface activation of 50/50 p(LLA—CL) discs are reported in Table 2.

TABLE 2

| Sample | reactive base | reactive acid | temperat. of tr'tm'nt (° C.) | wetting angle (°) | viscosity iner. (dl/g) |
|---|---|---|---|---|---|
| I | — | — | — | 82 | 3, 04 |
| II | NaOH 5% | — | 40 | 30 | 3, 00 |
| III | NaOH 5% | HCl 3% | 20 | 47 | — |
| IV | NaOH 5% | — | 20 | 48 | 3, 02 |
| V | NaOH 5% | HCl 3% | 20 | 70 | — |

EXAMPLE 12

Cell culture on plasma: air 50 W 1' surface activated discs

Isolation of the endothelial cells and the cell culture were achieved using the modalities for example 6.

The SEM analysis of the lactic acid copolymer discs subjected to activation by oxygen at 50 W for 1' evidenced a semiconfluent single layer of cells with prevalently spindled morphology.

Figure 5:
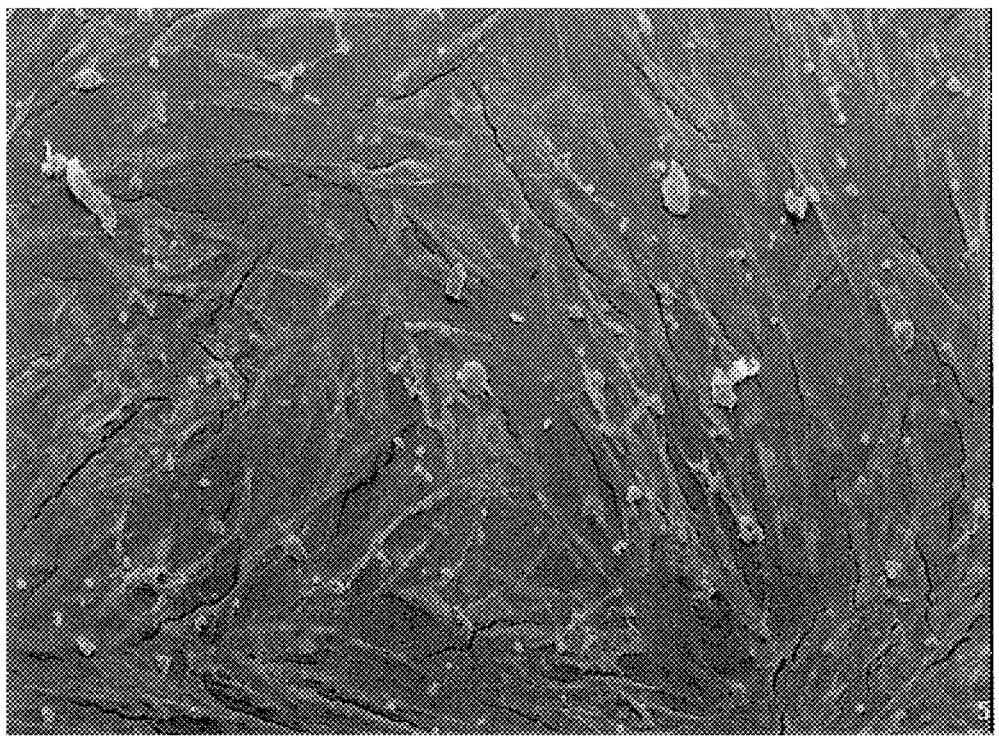

The cells appear particularly flat, a characteristic which permits sight, in transparency, of both the cytoplasmic organoids and the nucleus and sometimes even the nucleolus—see photograph of FIG. 5.

EXAMPLE 13

Cell culture on plasma: 02, 50 W 30" surface activated discs

Isolation of the endothelial cells and the cell culture were achieved using the modalities for example 6.

Figure 6:
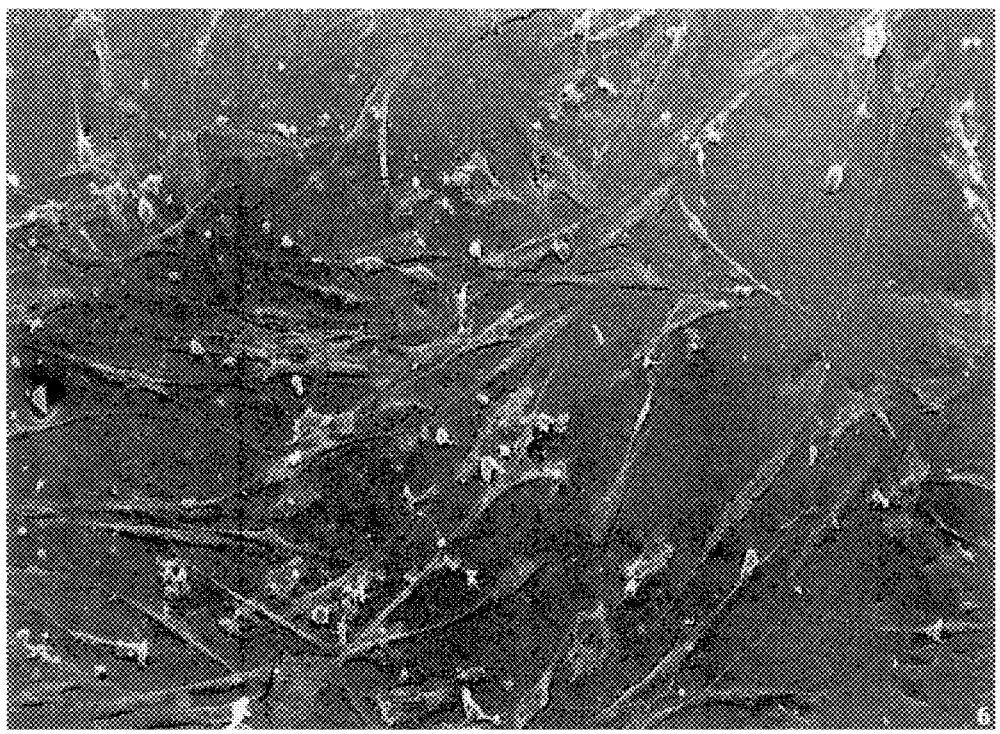

The SEM analysis of the lactic acid copolymer discs subjected to activation by oxygen at 50 W for 30" evidenced a semiconfluent single layer of cells with prevalently elongate and flattened morphology. In some zones the cells appear less frequent and relatively large areas of polymer are left uncovered—see photographic reproduction of FIG. 6.

EXAMPLE 14

Cell culture on plasma: Ar, 50 W, 1' surface activated discs

Isolation of the endothelial cells and the cell culture were achieved using the modalities for example 6.

Figure 7:
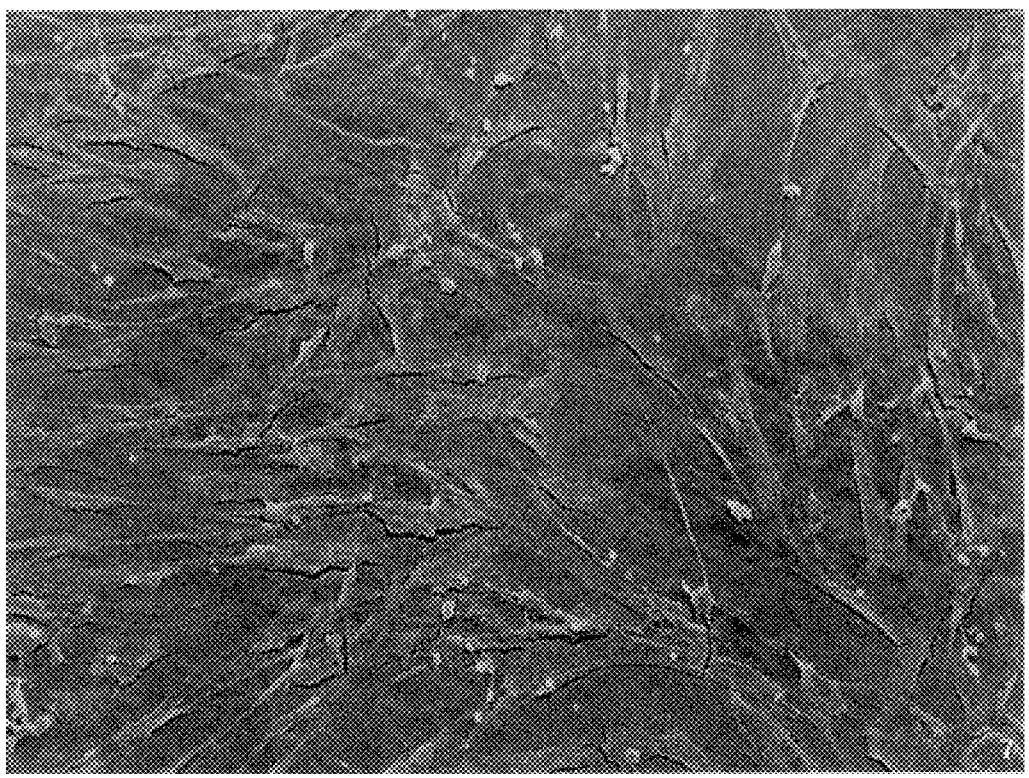

The SEM analysis of the lactic acid copolymer discs subjected to activation by argon at 50 W for 1' evidenced a semiconfluent monostrate of spindled and particularly flat cells—see photograph of FIG. 7.

This characteristic possibly represents the morphological equivalent of a more tenacious cell adherence to the non-activated substrate.

EXAMPLE 15

Preparation of a partially bioabsorbable vascular prosthesis the prosthesis was prepared with poly(L-lactide-co-$\epsilon$-caprolactone) 50:50 by weight, synthesized as described in the example 1. A sample of 8.0 g of this copolymer was dissolved in anhydrous methyl acetate, to a volume of 100 ml. A rotating glass bar, fixed at one end in a mechanical stirrer and having a diameter of 60 mm, was immersed in the solution. The bar was then slowly pulled out, so obtaining a uniform coating and the solvent was then evaporated at room temperature, with a gentle air stream. After having turned upside the glass bar, the operation was repeated to get a second layer and so on to prepare a prosthesis having the desired thickness, of 300 micron. The prosthesis, having a length of 10 cm, was dried under vacuum at room temperature and kept under nitrogen.

Alternatively the prosthesis was obtained by operating with an extruder having a screw with a length of 30 cm. The extrusion was performed at a speed of 40 rpm and at temperatures of 130° C., 150° C., 165° C., 170° C., 140° C., respectively from the first zone to the head of the extruder. The desired wall thickness was obtained by varying the flux of air insufflated in the extruder head and the take up speed.

The prosthesis prepared with one of the above described methods was at last wrapped with a Dacron® reinforcement, in the form of a stitch, to improve the mechanical properties both of the prosthesis itself and of the duct to be rigenerated.

The activation of the prosthesis was performed with an Ar cold plasma, by operating at 50 W, 3 minutes, at the temperature of 20° C. The activated prosthesis was then sterilised and seeded with endothelial cells, with the methodology described in the example 9, before being implanted.

The invention as it is exemplified above is susceptible to numerous modifications and variations all falling within the ambit of protection of the following claims.

What is claimed is:

1. A process for the surface treatment of biocompatible and bioabsorbable aliphatic polyesters selected from a group consisting of homo and copolymers derived from L-lactide, D-lactide, D,L -lactide, racemic D,L-lactide, meso D,L-lactide, $\epsilon$-caprolactone, glycolide, $\delta$-valerolactone, p-dioxanone, copolymers of L-lactide, D-lactide, racemic D,L-lactide, meso D,L-lactide with $\epsilon$-caprolactone used for the production of a biomedical product, comprising carrying out an acid or base hydrolysis at temperatures between about 0° C. and the softening temperature of the material and/or a treatment by cold plasma, said surface treatment increasing the surface hydrophilicity and lowering the wetting angle, as measured with water at about 23° C. in air, and limiting the reduction in the mechanical properties of the product; and wherein said hydrolysis treatment is conducted in the presence of an aqueous solution of a base.

2. A process as claimed in claim 1, wherein the said aliphatic polyesters comprise 50/50 poly(L-lactide-co-$\epsilon$-caprolactone) and the hydrolysis is conducted at temperatures comprised between about 5° C. and about 80° C.

3. A process as claimed in claim 1 wherein the base is a strong alkali.

4. A process as claimed in claim 3, wherein the strong alkali is selected from a group consisting of NaOH, KOH, Na$_2$CO$_3$, LiOH, and Ca(OH)$_2$.

5. A process as claimed in claim 1, wherein the base is a weak base.

6. A process as claimed in claim 5, wherein the weak base is NH$_4$OH.

7. A process as claimed in claim 5, wherein the weak base comprises at least one amine.

8. A process as claimed in claim 7, wherein the amine comprises at least one amine selected from a group consisting of methylamine, ethylamine, diethylamine and dimethylamine.

9. A process as claimed in claim 1, wherein the hydrolysis treatment is conducted in the presence of an aqueous solution of an acid.

10. A process as claimed in claim 9, wherein the acid is selected from a group consisting of HCl, HClO$_3$, HClO$_4$, $H_2SO_3$, $H_2SO_4$, $H_3PO_3$, $H_3PO_4$, HI, $HIO_3$, HBr, lactic acid, and glicolic acid.

11. A process for the surface treatment of biocompatible and bioabsorbable aliphatic polyesters selected from a group consisting of homo and copolymers derived from L-lactide, D-lactide, D,L -lactide, racemic D,L-lactide, meso D,L-lactide, ϵ-caprolactone, glycolide, δ-valerolactone, p-dioxanone, copolymers of L-lactide, D-lactide, racemic D,L-lactide, meso D,L-lactide with ϵ-caprolactone used for the production of a biomedical product, comprising carrying out an acid or base hydrolysis at temperatures between about 0° C. and the softening temperature of the material and/or a treatment by cold plasma, said surface treatment increasing the surface hydrophilicity and lowering the wetting angle, as measured with water at about 23° C. in air, and limiting the reduction in the mechanical properties of the product the surface hydrolysis is followed by washing for removing of acid or base.

12. A process as claimed in claim 1, wherein the plasma treatment is carried out in a presence of a reactive gas for a formation of surface activations of oxygenate type.

13. A process as claimed in claim 12, wherein the reactive gas is air and said surface activations of oxygenate type are —OH, —CHO, —COOH.

14. A process as claimed in claim 12, wherein the plasma treatment is carried out in a presence of argon.

15. A process as claimed in claim 12, wherein the plasma treatment is carried out with oxygen.

16. A process as claimed in claim 12, wherein the plasma treatment is carried out with air.

17. A process as claimed in claim 1, wherein the hydrolysis or the plasma treatment is followed by a phase of induction of further chemical modifications.

18. A process as claimed in claim 17, wherein —COONa groups generated by base hydrolysis are converted into —COOH groups by means of treatment with strong mineral acids.

19. A process as claimed in claim 17, wherein a surface freeing of alcoholic and/or carboxylic and/or aldehydic groups by means of a hydrolysis process is followed by a chemical reaction by means of addition of a compound provided with an activated group or groups which react with respective surface alcoholic and/or carboxylic and/or aldehydic groups.

20. A process as claimed in claim 19, wherein the compound comprises succinic anhydride, which causes a conversion of —OH groups into —O—CO—$CH_2$—$CH_2$—COOH groups.

21. A product for biomedical use obtained by a process for the surface treatment of biocompatible and bioabsorbable aliphatic polyesters selected from a group consisting of homo and copolymers derived from L-lactide, D-lactide, D,L -lactide, racemic D,Llactide, meso D,L-lactide, ϵ-caprolactone, glycolide, δ-valerolactone, p-dioxanone copolymers of L-lactide, D- lactide, racemic D,L-lactide, meso D,L-lactide with ϵ-caprolactone, said surface treatment increasing the surface hydrophilicity and lowering the wetting angle and limiting a reduction in the mechanical properties of the product, said product being obtained by means of a process according to claim 1.

22. A product for biomedical use as claimed in claim 21, wherein the copolymers of L-lactide, D-lactide, D,L-lactide with ϵ-caprolactone are surface-activated with at least one of the groups selected from COONa, —COOH, OH.

23. A partially bioabsorbable vascular prosthesis, comprising a product as claimed in claim 21.

24. A prosthesis as claimed in claim 23, comprising a reinforcement sheath.

25. A process as claimed in claim 2 wherein the temperature is between about 30° C. and about 50° C.

26. A product of claim 21 for use as a prosthesis.

27. A process as claimed in claim 11 wherein the plasma treatment is carried out in a presence of reactive gas for a formulation of surface activations of oxygenated type.

28. A product for biomedical use obtained by a process for the surface treatment of biocompatible and bioabsorbable aliphatic polyesters selected from a group consisting of homo and copolymers derived from L-lactide, D-lactide, D,L -lactide, racemic D,Llactide, meso D,L-lactide, ϵ-caprolactone, glycolide, δ-valerolactone, p-dioxanone preferably copolymers of L-lactide, D- lactide, racemic D,L-lactide, meso D,L-lactide with ϵ-caprolactone, said surface treatment increasing the surface hydrophilicity and lowering the wetting angle and limiting a reduction in the mechanical properties of the product, said product being obtained by means of a process according to claim 11.

* * * * *